United States Patent
Huang et al.

(10) Patent No.: US 11,555,480 B2
(45) Date of Patent: Jan. 17, 2023

(54) PRESTRESSED-BOLTED DRY-ASSEMBLED SEGMENTAL PRECAST HYBRID TOWER WITH GROUTING-FREE

(71) Applicant: POWERCHINA HUADONG ENGINEERING CORPORATION LIMITED, Zhejiang (CN)

(72) Inventors: Chunlin Huang, Zhejiang (CN); Dongliang Zhang, Zhejiang (CN); Qunyi Tang, Zhejiang (CN); Xingjian Sun, Zhejiang (CN); Jinjun Chen, Zhejiang (CN); Weijiang Feng, Zhejiang (CN); Huafeng Yu, Zhejiang (CN); Kun Fu, Zhejiang (CN); Tianhao Li, Zhejiang (CN); Fei Wang, Zhejiang (CN); Junzhong Xue, Zhejiang (CN); Ziteng Peng, Zhejiang (CN); Zhongshuai Yuan, Zhejiang (CN)

(73) Assignee: POWERCHINA HUADONG ENGINEERING CORPORATION LIMITED, Zhejiang (CN)

( * ) Notice: Subject to any disclaimer, the term of this patent is extended or adjusted under 35 U.S.C. 154(b) by 136 days.

(21) Appl. No.: 17/129,231

(22) Filed: Dec. 21, 2020

(65) Prior Publication Data
US 2022/0056884 A1   Feb. 24, 2022

(30) Foreign Application Priority Data
Aug. 21, 2020   (CN) .......................... 202010847254.2

(51) Int. Cl.
*F03D 13/20*   (2016.01)
*E02D 27/42*   (2006.01)
(Continued)

(52) U.S. Cl.
CPC ............ *F03D 13/22* (2016.05); *E02D 27/425* (2013.01); *E04H 12/085* (2013.01); *E04H 12/12* (2013.01); *E04H 12/16* (2013.01); *E04H 12/342* (2013.01)

(58) Field of Classification Search
CPC ....... F03D 13/22; F03D 13/20; E02D 27/425; E04H 12/085; E04H 12/12; E04H 12/16; E04H 12/342
See application file for complete search history.

(56) References Cited

U.S. PATENT DOCUMENTS

2014/0033628 A1* 2/2014 Lockwood .............. F03D 13/20
52/223.5

* cited by examiner

*Primary Examiner* — Andrew J Triggs
(74) *Attorney, Agent, or Firm* — Muncy, Geissler, Olds & Lowe, P.C.

(57) ABSTRACT

The present invention discloses a prestressed-bolted dry-assembled segmental precast hybrid tower with grouting-free, comprising a top steel tower tube, a reverse self-balancing steal-concrete transition section, and a prestressed-bolted dry-assembled segmental precast concrete tower with grouting-free dry fast splicing and a gear reinforced wind turbine foundation; the steel tower tube, the steel-concrete transition section, the concrete tower tube and the hollow wind turbine foundation are integrally connected from top to bottom through a prestressed steel strand system to improve the overall bending resistance of the tower; the upper end of the prestressed steel strands is anchored to the steel-concrete transition section, and the lower end is anchored to the bottom face of the wind turbine foundation corbel; the concrete tower tube is composed of a number of segmental tapered precast concrete tower segments, which are grouting free spliced vertically, and the vertical splicing utilizes positioning pins to accurately position the installation position. The prefabricated concrete tower tube segment is formed by a number of circular arc-shaped prefabricated (Continued)

concrete pipe segments with circumferential grouting free dry splicing. The segments are spliced into a whole by prestressed bolts and then installed staggered from top to bottom to enhance the shear resistance.

7 Claims, 9 Drawing Sheets

(51) Int. Cl.
*E04H 12/08* (2006.01)
*E04H 12/12* (2006.01)
*E04H 12/16* (2006.01)
*E04H 12/34* (2006.01)

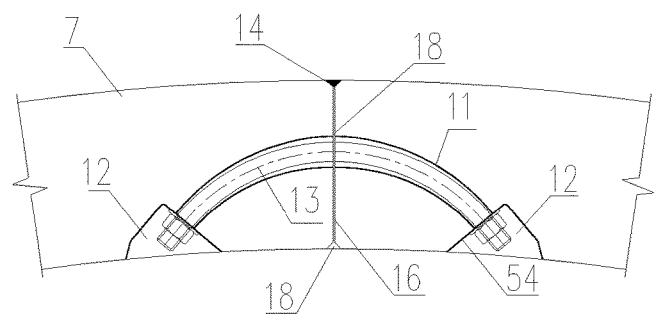
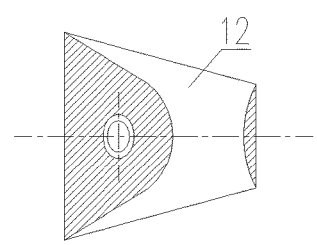
Fig. 3-1          Fig. 3-2
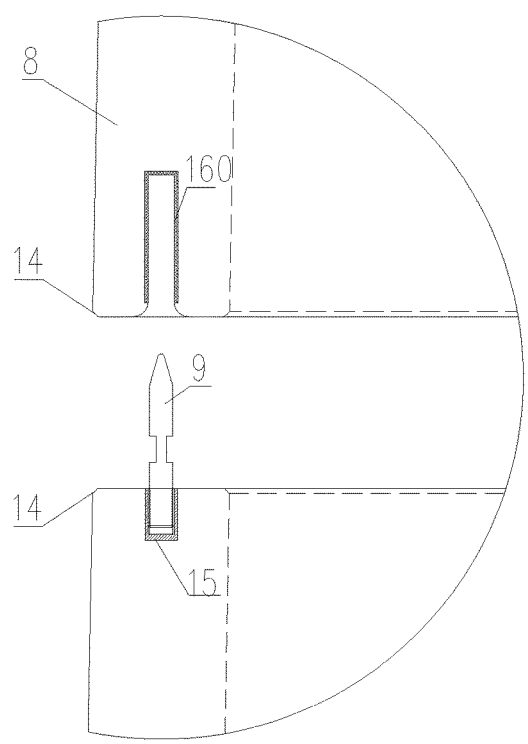
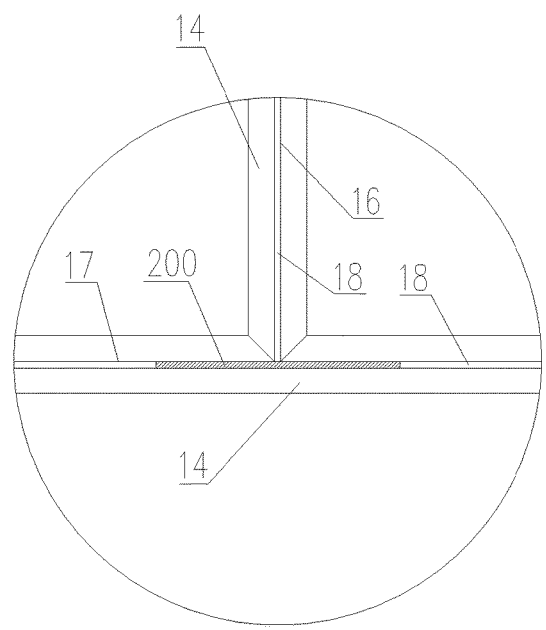
Fig. 4-1          Fig. 4-2

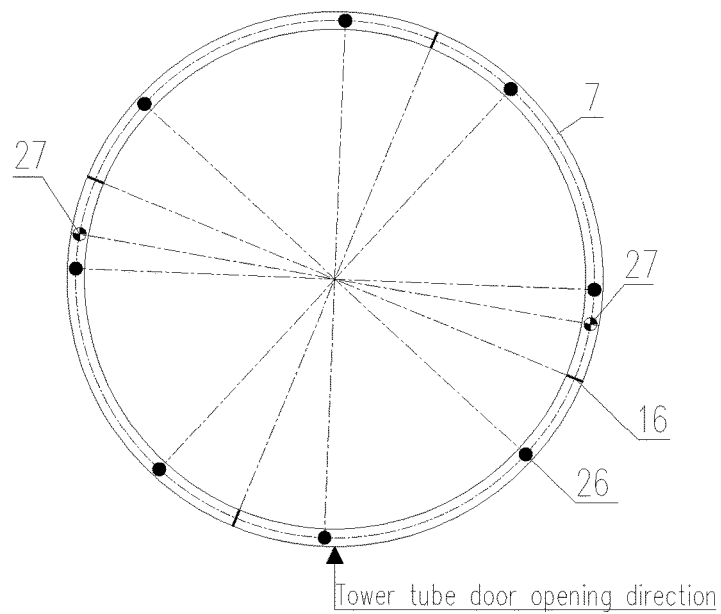
Fig. 7
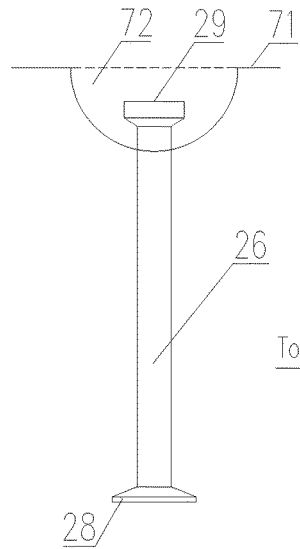 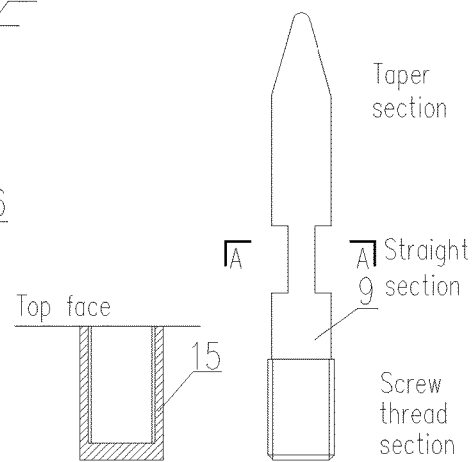 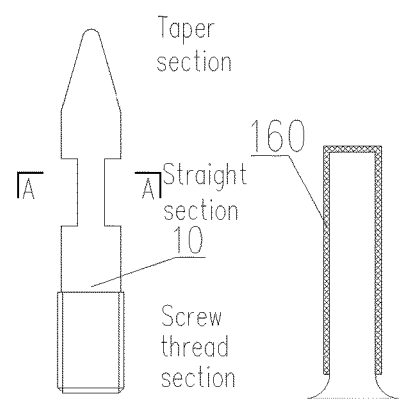
Fig. 8-1   Fig. 8-2   Fig. 8-3   Fig. 8-4   Fig. 8-5
Fig. 8-6

PRESTRESSED-BOLTED DRY-ASSEMBLED SEGMENTAL PRECAST HYBRID TOWER WITH GROUTING-FREE

TECHNICAL FIELD

The invention belongs to the technical field of onshore wind power generation, in particular to a conventional steel tower with a prestressed-bolted dry-assembled segmental precast hybrid tower with grouting-free at the lower part.

BACKGROUND

It is an inevitable trend of wind power industry development that subsidies are gradually declining to achieve parity. How to reduce the cost of electricity per kilowatt hour and improve the generation capacity is a practical problem in front of wind power practitioners. There are three ways to improve power generation in the industry: increasing unit capacity, increasing impeller diameter and increasing hub height, and the three technical means are usually combined to maximize power generation. In the future, the onshore wind power market will gradually develop from traditional wind resource rich area to low wind speed area, and the wind turbine will develop to large single machine capacity and large impeller diameter. At present, the tower with 140 m hub height has entered the stage of large-scale commercial application, and will develop to a higher hub height in the future.

At present, most of the high-tower market uses steel conical towers, but as the height of the tower's hub increases, its overall stiffness decreases, which will induce poor vibration characteristics of wind turbines, and there are problems with frequency ride-through and vortex-induced vibration. The control strategy of the unit is extremely demanding, which limits the development of high-tower wind turbines. Because concrete has the characteristics of high rigidity and strong plasticity, the second technical route to raise the height of the hub is to introduce concrete medium. The lower part adopts concrete tower and the upper part adopts conventional steel tower, which can comprehensively utilize the rigidity advantage of the concrete tower and the rapid construction advantage of the steel tower, and weighs the safety, cost and construction period of the tower. At present, the existing steel-concrete hybrid towers (hereinafter referred to as "hybrid towers") are divided into pieces by setting exposed reinforcement bars on the splicing face during prefabrication, and spliced on-site by inserting the bars and grouting (also known as "wet connection"). The entire tower can be ring hoisted only after the grouting material reaches the design strength, which the construction efficiency is low and it is difficult to meet the large-scale popularization and application. In addition, the existing hybrid tower solution has the following problems: (1) it is difficult to guarantee the quality of the extensive prefabrication maintenance of the mobile prefabrication factory; (2) the prefabrication and transportation of the entire ring or C-slice is limited, and the transportation cost of large parts is expensive; (3) the precast components have poor flatness and cumbersome leveling procedures, and long grouting connection maintenance time causes uncontrollable construction period.

SUMMARY

The purpose of the present invention is to provide a segmental precast hybrid tower with factory intensive prefabrication production, long-distance radiation transportation, grouting-free dry assembling and hoisting with rapid construction and installation, full structure integrated design and batch process construction, exquisite structure and strong bearing capacity. Therefore, the present invention adopts the following technical scheme:

A prestressed-bolted dry-assembled segmental precast hybrid tower with grouting-free comprises a top steel tower tube, a steel-concrete transition section, a concrete tower tube, a bottom hollow wind turbine foundation and prestressed steel strands, which the steel tower tube, the steel-concrete transition section, the concrete tower tube and the hollow wind turbine foundation are connected by the prestressed steel strands from top to bottom to improve the overall bending resistance of the tower, and the precast concrete tower segment is formed by splicing several circular arc-shaped precast concrete pipe segments in the circumferential direction; wherein:

The upper end of the prestressed steel strands are anchored to the anchor flange plate which is overhanging to the center of the steel-concrete transition section, and the lower end is anchored on the bottom face of the wind turbine foundation corbel, so that the prestressed steel strands do not pass through the inner part of the concrete tower;

The hybrid tower adopts external prestressed steel strands, which the circular arc-shaped precast concrete pipe segments are not provided with steel strand through pipes, are not provided with connecting reinforcement bars on the vertical and horizontal end faces, but are solid pipe segments with smooth surfaces on all sides, so that the flatness of the upper end face of the pipe segments is not greater than 2 mm, and the flatness difference of the vertical end faces of the pipe segment are not greater than 2 mm, to achieve the high-precision requirements of grouting-free dry splicing and effective control of the thickness of the following structural adhesive;

The circular arc-shaped precast concrete pipe segments are not provided with reinforcement bar connection in the circumferential direction, but are formed by grouting free dry splicing, and are connected by horizontally circumferentially arranged prestressed bent bolts;

The quick-setting structural adhesive is used for grouting free splicing between the concrete tower tube segments, the maximum thickness of the structural adhesive is not greater than 3 mm, the curing time of the quick-setting structural adhesive is less than 1 hour, and the strength can reach C80 in 7 days; the same structural adhesive that are used between the horizontal seams of the concrete tower tube segments can also be used between the vertical seams of the concrete tower tube segments;

Thin structural adhesive is used for grouting free splicing between the vertical end faces of the segments, and the maximum thickness of the structural adhesive is not greater than 3 mm;

The concrete tower tube segments are positioned by positioning pins, and the upper and lower segments are accurately positioned and installed to enhance the shear performance; thickness control gaskets are set between all vertical seams of the upper concrete tower tube segments and the upper end face of the lower concrete tower tube segments;

The structural adhesive has higher compressive and tensile properties than the concrete strength of the segment body, the structure adhesive has short curing time, which has the advantages of quick setting and curing to reach the lifting strength, meeting the rapid construction requirements of the instant assembling and lifting, and the structural adhesive has the properties of water separation and anti-aging;

A ring of groove is set in the contact area between the top face of the wind turbine foundation and the bottom concrete tower tube, a reinforcement bar mesh is placed at the bottom of the groove, a steel grid is placed at the top, and a leveling bolt is set at the lower part of the steel grid; after leveling the steel grid, C80 high-strength grouting material is poured into the groove and closes the surface to within 2 mm of flatness to form a leveled reinforcement structure; as a preferred scheme, the width of the groove can be set as two times of the wall thickness of the bottom segment, and the bottom segment is placed in the middle of the groove to realize the reasonable diffusion of concentrated stress in the contact area;

The left and right sides and the upper and lower end faces of the circular arc-shaped precast concrete pipe segments are provided with chamfers, which provides an attachment area for a small amount of extruded adhesive from the pipe segment sections during the splicing process, on the other hand, it is convenient for the protection of the sharp angles of the pipe segments during the demoulding process.

Furthermore, the pipe segment size segmentation needs to meet the requirements of normal road transportation. After loading, the height is usually controlled below 4.5 m, and the width is controlled below 3 m, so as to meet the requirements of normal passing through culverts, high-speed toll stations and other height and width limit road sections, and realize long-distance radiation transportation.

Further, the bottom of the concrete tower tubes at non-wading machine positions have a door opening, and the door opening section of the concrete tower tubes at wading machine positions can be raised according to the flood control elevation for the convenience of personnel access and equipment transportation; the concrete segments at the door opening can realize two-way compensation of strength and stiffness by setting reinforced beams and columns or reinforced embedded steel plates.

Further, the wind turbine foundation adopts a gear-reinforced hollow wind turbine foundation, the middle pier of the hollow wind turbine foundation is concave inward to form a containing cavity, and the bottom of the containing cavity protrudes outward to form a plurality of concave cavity structures arranged circumferentially, correspondingly, the middle pier between the two adjacent concave cavity structures forms a gear-shaped reinforcing pier protruding inward; the middle pier at the top of each concave cavity structure is used as the corbel, and the top face of the concave cavity structure and the top face of the hollow wind turbine foundation are preset with steel strand through pipes for the steel strands to pass through; the middle pier of the hollow wind turbine foundation is empty, and the bearing platform and bottom plate can be either disc type or polygonal raft plate.

Furthermore, the size of the concave cavity structure is only suitable for the construction operation space of the steel strand prestressing; a reinforced pier is arranged between the two adjacent concave cavity structures, and a gear-shaped reinforced pier is formed in the wind turbine foundation to enhance the connection strength between the middle pier of the foundation, the cap and the bottom plate; the wind turbine foundation cancels the long cantilever middle pier structure, which can greatly reduce the time of removing the formwork of the hollow foundation and the waiting time of following procedures.

Furthermore, the hollow wind turbine foundation is embedded with the steel strand through pipe and lower anchor pad plate, and a spiral hoop is usually set at the position of the anchor plate to enhance the local bearing capacity of the concrete structure at the anchor end.

Furthermore, the steel-concrete hybrid transition section includes an upper flange plate, the anchor flange plate, a lower flange plate, a flange tube section, a stiffening plate and upper anchor pad plates, in which the upper flange plate, the anchor flange plate and the lower flange plate are all circular ring-shaped steel plates, which are welded with the flange tube section; the upper flange plate is connected with the bottom flange of the steel tower tube through high-strength bolt assembly, and the prestressed anchor flange plate is provided with prestressed steel strand perforations corresponding to the number of the prestressed steel strands.

Furthermore, the stiffening plate is placed between the anchor flange plate and the lower flange plate, and is evenly circumferentially arranged on both sides of the steel strand perforations in pairs; the upper part of the stiffening plate is welded with the anchor flange plate, the outer side is welded with the inner wall of the flange tube section, and the lower part is welded with the lower flange plate; the arc-shaped openings are set at the connection between the upper end of the stiffening plate and the inner wall of the anchor flange plate and the inner wall of the flange tube section to make the local stress transition smoothly, and optimize the stress transmission path; the stiffening plate is trapezoidal steel plate with the upper end flush with the inner side of the anchor flange plate and the lower end flush with the inner side of lower flange plate.

Furthermore, the anchor flange plate overhangs the inner facade of the concrete tower tube, and the upper anchor ends of the steel strands are offset to the center side of the tower tube, so as to avoid the interference between the prestressed steel strands and the inner wall of the concrete tower tube; on the premise of non-interference, the steel strands are arranged close to the inner wall of the tower tube as much as possible to increase the root separation of the steel strands; the anchor pad plates corresponding to the number of the prestressed steel strands are placed on the top face of the anchor flange; the bottom face of the anchor pad plates is flat, and the top face is inclined; the slope of the inclined face is orthogonal to the steel strands.

Further, the lower flange plate is provided with a transition section positioning pin perforation to ensure accurate installation of the transition section.

Furthermore, all welds in the steel-concrete transition section need to be polished to eliminate residual stress.

The beneficial effects of the present invention are:

(1) The present invention provides a prestressed-bolted dry-assembled segmental precast hybrid tower with grouting-free, which can provide a segmental precast hybrid tower with factory intensive prefabrication production, long-distance radiation transportation, grouting-free dry assembling and hoisting with rapid construction and installation, full structure integrated design and batch process construction, and is not only exquisite in structure but also strong in bearing capacity.

(2) The reasonable segmentation of the concrete pipe segments can meet the requirements of normal road transportation, realize the radiation and promotion of the industrial chain, abandon the disadvantages of the existing concrete tower scheme that uses the extensive production mode of mobile prefabrication factory, which leads to disadvantages in environmental protection, land acquisition, low prefabrication accuracy, poor maintenance quality and prefabrication continuity; at the same time, it has the scheme advantages of promoting and applying overseas.

(3) By adopting the factory high-precision prefabrication mode, the control standards for 2 mm pipe segment prefabrication flatness and 3 mm hoisting flatness and corresponding precast components are proposed, which can realize the high-precision requirements of rapid grouting free dry splicing, realize the gap-free construction goal of instant assembling and lifting, significantly reduce the construction period, ensure the reasonable thickness of the structural adhesive, ensure the exquisite seams, and effectively improve the structural strength of the seams.

(4) The cone-shaped body is adopted, and the plan is flexible; the height of the concrete section and steel section can be flexibly combined, and on the premise of keeping the tower taper unchanged, by increasing or decreasing a small part of the concrete tower segments at the top or bottom, and keeping most of the segments in the middle unchanged, the adaptability of the tower to different stand-alone capacity, hub height and wind turbine load can be realized; the concept can ensure the versatility of the mold, reduce costs and increase efficiency.

(5) The gear-reinforced hollow wind turbine foundation can effectively strengthen the stress concentration area of the traditional hybrid tower hollow foundation, thus optimizing the overall size and project volume of the wind turbine foundation; compared with the traditional hollow wind turbine foundation, the cantilever structure at the middle pier is canceled, which the foundation formwork removal time is greatly reduced, and the waiting time of subsequent processes is shortened.

(6) The steel-concrete transition section proposed in the present invention utilizes the principle of reverse self-balance, and by setting stiffening plate between the anchor flange plate and the lower flange plate, the rigidity of integral connecting flange can be increased only by increasing the height of the stiffening plate or thickening the stiffening plate, rather than increasing the thickness of flange plate; compared with the traditional L-shaped thick flange, the material and machining cost can be greatly reduced, and the disadvantages of short length of the connecting bolts, the poor fatigue resistance, and the serious prestress loss of the traditional L-type flange can be avoided.

(7) The gear-reinforced wind turbine foundation, the grouting free dry quick splicing precast concrete tower tube and the reverse self balancing steel-concrete transition section cover the whole structure support of the hybrid tower integrated design from bottom to top, which can realize the development requirements of large-scale and high-altitude wind turbine, and can effectively utilize the wind resources in low wind speed area.

BRIEF DESCRIPTION OF THE DRAWINGS

FIG. 3-1 and FIG. 3-2 are the schematic diagram of a hole of the prestressed bent bolt (i.e. enlarged view of Part D in FIG. 2) and the schematic diagram of nut installation groove in the embodiment of the present invention.

FIG. 4-1 is a partial schematic diagram of the assembly detail of the positioning pin installation position on the upper and lower sections in the embodiment of the present invention, i.e. the enlarged view of Part E in FIG. 2.

FIG. 4-2 is a schematic diagram of the gasket in the embodiment of the present invention, i.e. the enlarged view of H part in FIG. 2.

FIG. 5-1 and FIG. 5-2 are respectively a schematic diagram and a partial schematic diagram of adding door opening reinforced beam column in the concrete tower tube bottom segment with the door opening in non-wading machine position in the embodiment of the present invention.

FIGS. 6-1, 6-2, and 6-3 are respectively a schematic diagram of a wading machine position door opening segment, a schematic diagram of adding a reinforced embedded steel plate and a partial enlarged view in the embodiment of the present invention.

FIG. 7 is a schematic diagram of the arrangement position of the embedded parts of the hanging nails and positioning pins at the top of the segment in the embodiment of the invention.

FIGS. 8-1, 8-2, 8-3, 8-4 and 8-5 are schematic diagrams of the tube segment embedded parts in the embodiment of the present invention. FIG. 8-6 is a cross-sectional view taken along line A-A of FIGS. 8-3 and 8-4.

DETAILED DESCRIPTION

The embodiment is a steel-concrete hybrid tower with a hub height of 140 m, a single machine capacity of 2.5 MW and an impeller diameter of 141 m. The present invention is further described in detail with the attached drawings.

Figure 1:
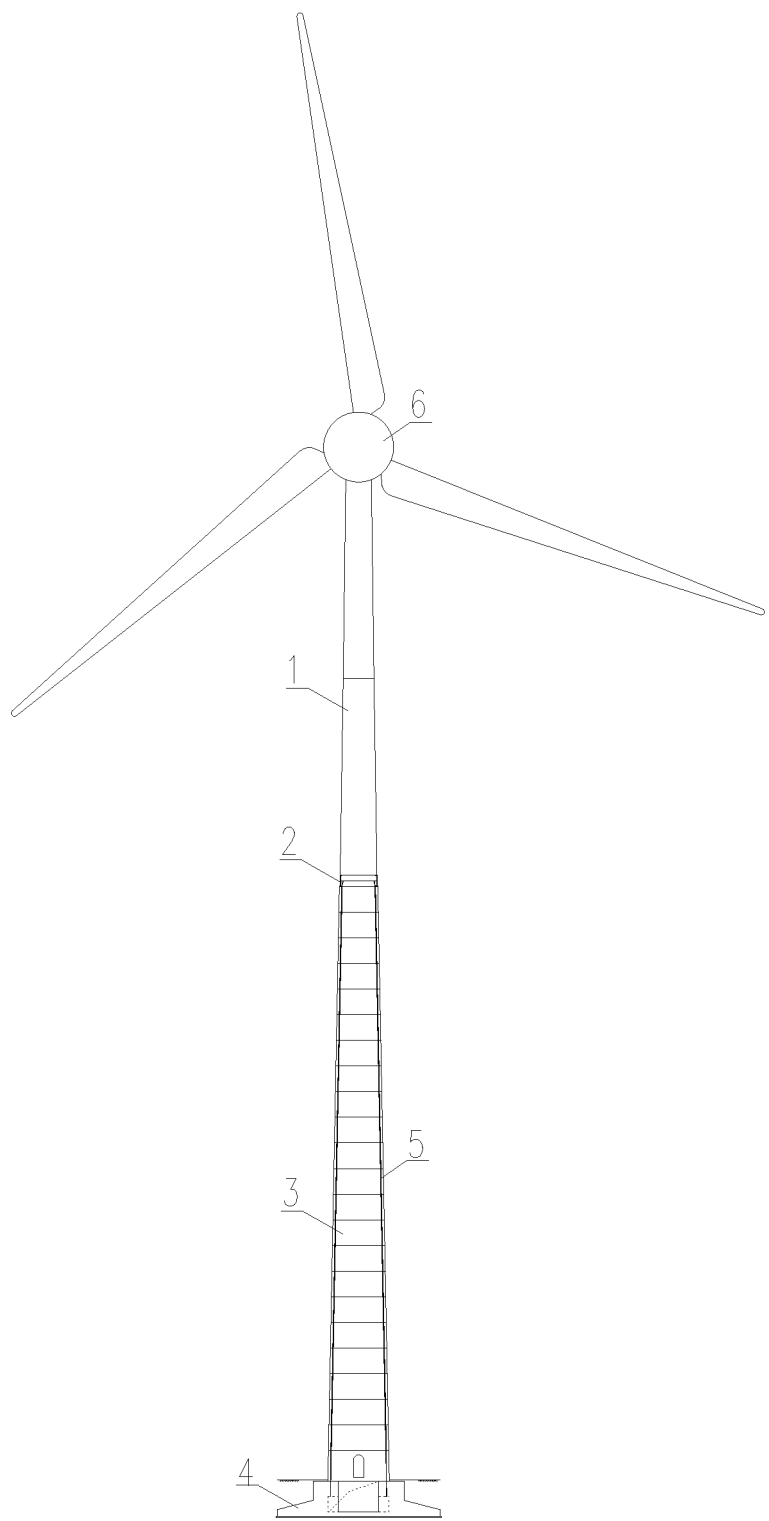
FIG. 1 is the overall elevation view of the tower frame of a prestressed-bolted dry-assembled segmental precast hybrid tower with grouting-free in the embodiment of the present invention.

As shown in FIG. 1, the main structure of the tower is a concrete-steel combined structure, including top steel tower tube 1, steel-concrete transition section 2, concrete tower tube 3, bottom hollow wind turbine foundation 4 and prestressed steel strands 5, in which the concrete tower tube 3 is 90.0 m high, the steel-concrete transition section 2 is 1.5 m high, the total height of steel tower tube section 1 is 46.0 m. and the top of steel tower tube 1 is 2.5 m away from the center of hub 6. The concrete tower tube 3 is composed of the 1$^{st}$ segment with a height of 3.0 m and door opening and the 2$^{nd}$~30$^{th}$ tapering segments with a height of 3.0 m. Each concrete tower tube segment 8 is composed of four quarter precast pipe segments 7 of the concrete tower tube with the same size. All pipe segments 7 meet the requirements of normal road transportation, and there is no exceeding with width, height or large parts transportation. The wall thickness of concrete tower tube 3 is 300 mm, and the prefabrication flatness of the pipe segment 7 section is less than 2 mm, so as to realize the high precision requirement of grouting free dry splicing. The steel tower tube 1 and the steel-concrete transition section 2 are connected by high-strength bolt assembly, and the steel-concrete transition section 2, the concrete tower tube 3 and the hollow wind turbine foundation 4 are connected by the prestressed steel strands 5 to improve the overall bending resistance of the tower frame. The upper end of the prestressed steel strand 5 is anchored on the anchor flange plate 46 of the steel-concrete transition section 2, and the lower end is anchored on the bottom face of the corbel of the wind turbine foundation 4. C60 concrete is used for the concrete tower tube 3 and C40 concrete is used for the wind turbine foundation 4.

As shown in FIG. 2~FIG. 4-1 and FIG. 4-2, the concrete tower tube segment 8 is composed of four quarter precast segments 7 with the same size that are grouting free spliced in circumferential direction. The circular arc-shaped precast concrete pipe segments 7 are not provided with steel strand through pipes, are not provided with connecting reinforcement bars on the vertical and horizontal end faces, but are solid segments with smooth surface, so that the flatness of the upper end face of the segment is less than 2 mm, and the flatness difference of the vertical end face is less than 2 mm, which can realize the high precision requirement of the grouting free dry splicing and effectively control the thickness of the structural adhesive below.

Firstly, apply structural adhesive 18 evenly on the splicing face of vertical seam 16, and after splicing, the bent bolt 13 is penetrated through the reserved hole 11 of bent bolt, and then tension and pre-tighten the bent bolt 13 to form a complete ring according to the design requirements. Then, apply structural adhesive 18 on the upper face of the lower concrete tower tube segment, and install the upper and lower concrete tower tube segments 8 according to 45° staggered seam after determining the installation position through positioning pins 9 and 10. The vertical seams 16 and circumferential seam 17 of the pipe segments 7 are all grouting free spliced by high-strength quick-setting structural adhesive 18. The compressive and tensile properties of the structural adhesive 18 are higher than the concrete strength of the segment body, and it has the advantages of quick-setting and curing to achieve the hoisting strength, which satisfies the rapid construction requirement of the instant assembling and lifting. Besides, the structural adhesive 18 has the water-proof and anti-aging properties, so as to meet the sealing and waterproof requirements of the tower design life.

The maximum thickness of the structural adhesive 18 at the vertical seams 16 and the circumferential seam 17 is no more than 3 mm. The structural adhesive 18 is a quick-setting structural adhesive, which the curing time is about 1 hour and the strength can reach C80 or more than in 7 days.

Figure 2:
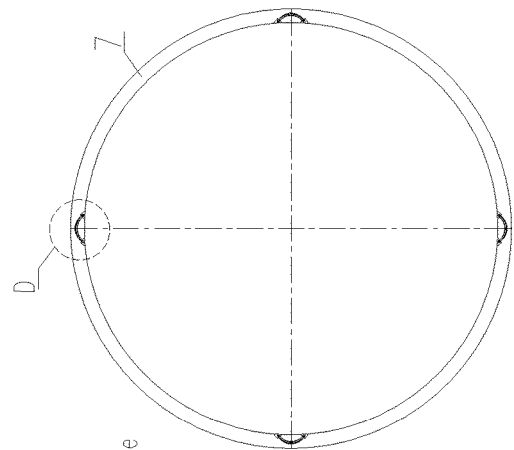
FIG. 2 is a schematic diagram of circumferential grouting free splicing and vertical staggered installation of four quarter pipe segments in the embodiment of the present invention.
Figure 2:
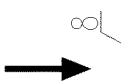
Figure 2:
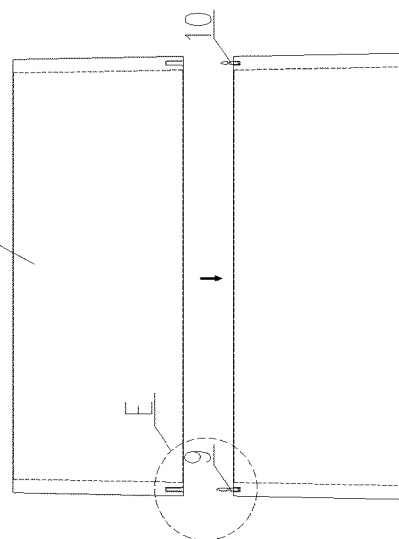
Figure 2:
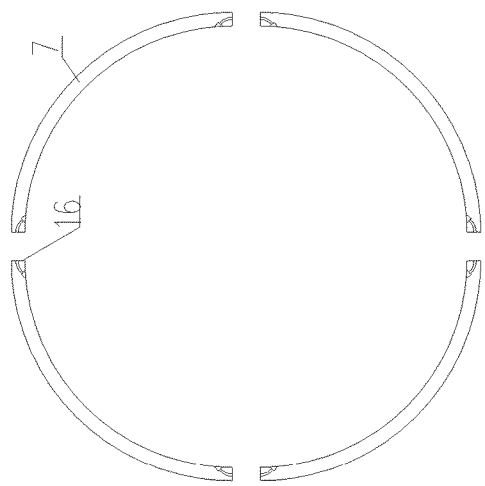
Figure 2:
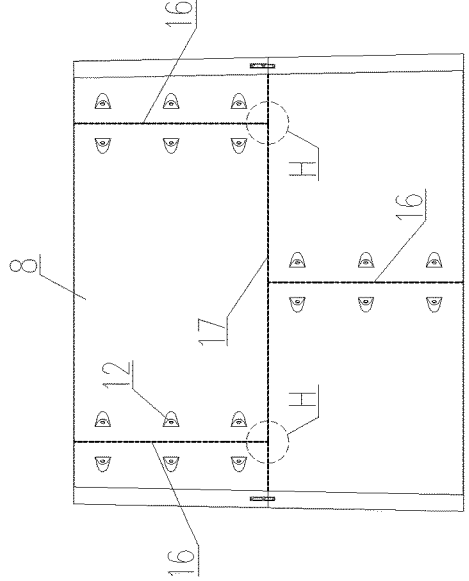
Figures 1, 6:
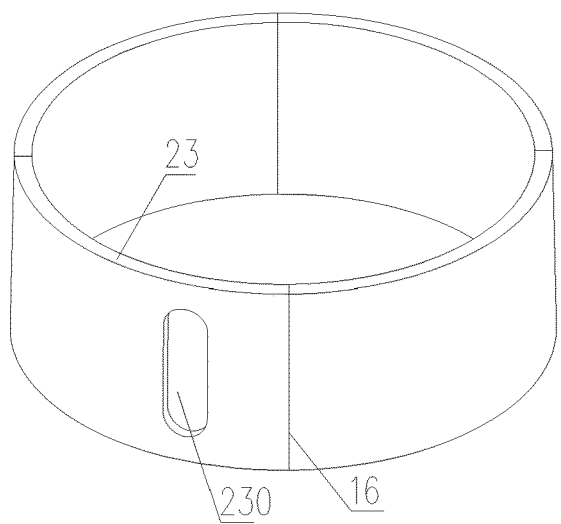
Figures 2, 6:
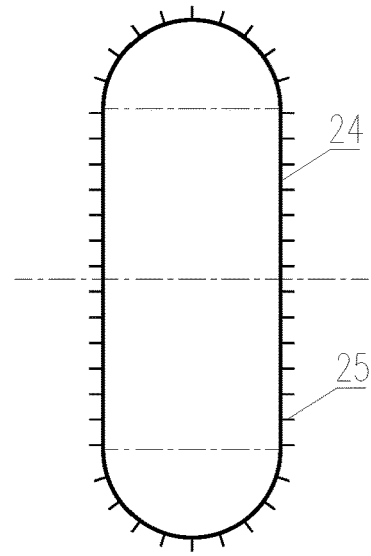
Figures 3, 6:
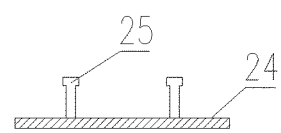

As shown in FIG. 2~FIG. 3-1 and FIG. 3-2, three horizontal holes 11 of the prestressed bent bolt are set on both sides of the pipe segments 7 of the concrete tower tube, and nut installation groove 12 is set at the corresponding position of inner wall. The end face 54 of nut installation groove 12 is orthogonal to the hole 11 of the prestressed bent bolt. 8 mm chamfer 14 is set on the left and right sides and inner and outer sides of the upper and lower end faces of the pipe segments 7. On the one hand, it is convenient to protect the corners of pipe segments 7 during demolding process. On the other hand, the chamfer 14 can provide an attachment area for a small amount of redundant structural adhesive 18 extruded from the section of the pipe segments 7 during splicing. In the actual construction process, after the pipe segments 7 are spliced into an integral ring, the chamfer 14 on the inner and outer sides of the vertical seams 16 is filled with structural adhesive 18; after the integral is hoisted, the chamfer inside the circumferential seam 17 is filled with structural adhesive 18.

The thickness control gasket 200 is set between all the vertical seams 16 of the upper concrete tower tube segment 8 and the upper end face of the lower concrete tower tube segment; not only can the self weight of the tower body be used to control the adhesive thickness, but also can make use of the flexibility of the structural adhesive 18 in the hoisting of the concrete tower tube segments 8 to level the slight up-and-down rubbing error between the pipe segments 7 generated during the hoisting of the concrete tower tube segments 8. The gasket 200 can be made into a variety of optional gaskets with different thicknesses, or the thickness of the gasket 200 is a unit thickness, and one or several gaskets are padded on the same position as required, and the total thickness of the thickness control gasket does not exceed 3 mm.

Figures 1, 5:
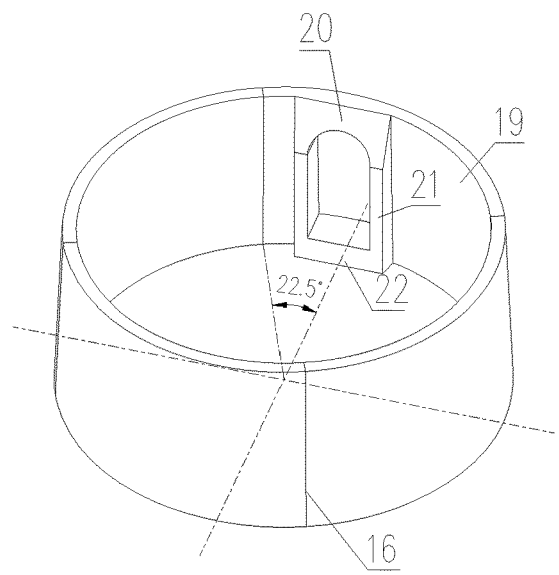
Figures 2, 5:
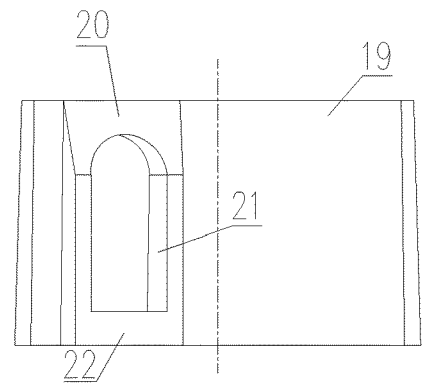

As shown in FIG. 5-1 and FIG. 5-2, in view of the situation that the concrete tower of the door opening segment is directly connected with the wind turbine foundation 4, the strength and stiffness of the opening are reinforced by reinforced beams and columns for door opening pipe segment 19. Considering that the position of the vertical seam of the upper tube segment is located at 45° of the door opening pipe segment, the center of the door opening is set at 22.5° of the pipe segment to ensure that the center line of the door opening is staggered with the position of the vertical seam 16 of the upper tube segment. The door opening pipe segment 19 is precast by mold, and the door opening reinforced beams and columns include a door opening base 22, door opening reinforced columns 21 on the two sides and a hidden beam 20 at the top of the door opening.

As shown in FIG. 6-1, FIG. 6-2 and FIG. 6-3, for some wading machine positions, the door opening segment usually needs to be raised above the flood control elevation. For the case where the door opening concrete tower tube segment is not directly connected with the wind turbine foundation 4, the reinforced embedded steel plate 24 is added to strengthen the strength and stiffness of the opening. The reinforced embedded steel plate 24 is welded and connected in a circle and arranged around the door opening 230. Considering that the position of the vertical seam of the upper tube segment is located at 45° of the door opening segment, the center of the door opening is set at 22.5° of the segment to ensure that the center line of the door opening is staggered with the position of the vertical seam 16 of the upper tube segment. The thickness of embedded steel plate 24 is 20 mm, and two rows of 92 studs 25 are welded around the embedded steel plate 24 to enhance the shear resistance of the embedded steel plate 25 and the concrete.

As shown in FIG. 7~FIG. 8, two round-head hanging nails 26 are set at the top of each segment, and the midpoint of the hanging nail 26 connecting line passes through the center of gravity line of the entire pipe segments 7, so as to ensure the vertical lifting of the pipe segments 7. In the process of prefabrication, the anchor foot 28 of the round-head hanging nail 26 overlaps with the reinforcement bar to enhance the local punching shear resistance of the concrete in the hoisting area. The buckle 29 at the top of the round-head hanging nail 26 is fastened by a duckbill buckle for hoisting, and the size of the round-head hanging nail 16 is selected according to the weight of the pipe segment 7. The top face 71 of the pipe segment 7 is provided with a counterbore 72 corresponding to the buckle 29, which is in the counterbore 72 without exposing the orifice.

As shown in FIG. 2, FIG. 4-1, FIG. 7, and FIG. 8-1~8-6, two positioning pins 9 and 10 are set at the top of each tower tube segment, arranged at an interval of 180°, and the corresponding positions at the bottom are provided with positioning pin reserved holes 160. The positioning pins 9 and 10 have a diameter of 32 mm, and the reserved holes 160 are adapted to the positioning pins with an inner diameter of 36 mm. The positioning pins are set with one long and one short one, and the top part of them is a tapered section, which is convenient for inserting into the positioning pin reserved hole 160 at the bottom of the upper tube segment. The long positioning pin 9 is set with the length of 300 mm, and the short positioning pin 10 is set with the length of 200 mm. During the integral hoisting, insert the long positioning pin 9 for preliminary positioning, fine-tune the angle of the tube segment, and slowly sleeve the short positioning pin 10 into the reserved hole 160 for precise positioning and installation.

FIGS. 8-1 to 8-5 show a summary of the segment embedded parts in this embodiment, including round-head hanging pin 26, a positioning pin fixed embedded part 15, the long positioning pin 9, the short positioning pin 10, and the positioning pin reserved hole 160.

As shown in FIG. 9 to FIG. 12, the wind turbine foundation 4 adopts a gear-reinforced hollow wind turbine foundation, comprising a hollow wind turbine foundation, a gear-reinforced pier 34 evenly arranged around the inner wall of the wind turbine foundation cavity, a top plate 32, an embedded cable sleeve 30 inside the foundation, and an embedded steel strand through pipe 31, etc., are pre-compressed and connected with the upper concrete tower tube 3 and the steel-concrete transition section 2 through the prestressed steel strands 5. A reinforced structure is set at the connection between the top face of the hollow wind turbine foundation 4 and the bottom concrete tower tube segment 3, including high-strength grouting material 40, steel grid 39, reinforcement bar 42, and leveling bolts 41, etc.

Figure 9:
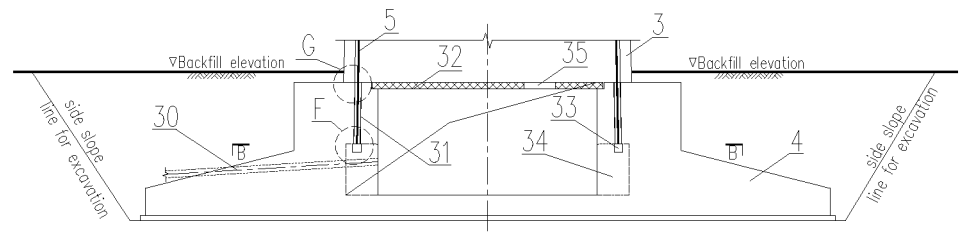
FIG. 9 is an elevation view of the gear-reinforced wind turbine foundation in the embodiment of the present invention.
Figure 10:
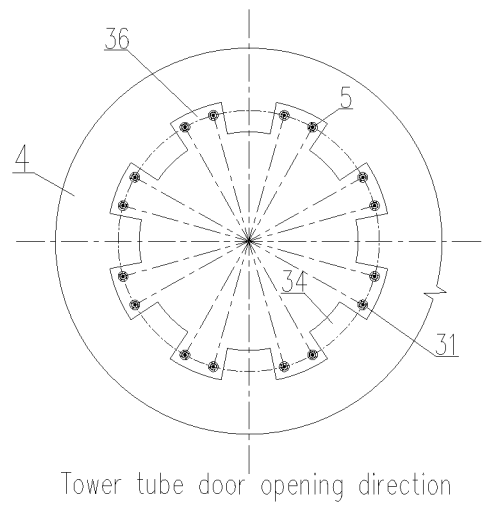
FIG. 10 is a B-B cross-sectional view of the middle pier position of the gear-reinforced wind turbine foundation in the embodiment of the present invention.

As shown in FIG. 9~FIG. 10, a lower manhole 35 is set on the top plate 32 of the foundation, which is convenient for the tensioning, anchoring and maintenance of the steel strand 5, and avoids high-altitude operations. The middle pier of the hollow wind turbine foundation 4 is hollow, and its cap and bottom plate can be either disc type or polygonal raft plate type.

The wind turbine foundation 4 adopts the gear-reinforced hollow wind turbine foundation, and the middle pier of the hollow wind turbine foundation is concave inward to form a containing cavity, and the bottom of the containing cavity protrudes outwards to form a plurality of cavity structures 36 arranged circumferentially. Since sixteen strands of steel strand 5 are used in the embodiment, eight cavity structures 36 are set, and corresponding reinforced piers 34 are set between the two adjacent cavity structures 36. There are eight reinforced piers 34 in total, which form a gear-shaped reinforced pier protruding inward in the wind turbine foundation; the middle pier part at the top of each cavity structure 36 is used as a corbel, and a steel strand through pipe 31 is preset between the top face of the cavity structure 36 and the top face of the hollow wind turbine foundation for the steel strand to pass through.

The size of the cavity structure 36 is only suitable for the construction operation space of the prestressed steel strand 5. The middle pier between the adjacent two cavity structures 36 are all set with gear-shaped reinforced pier 34 to enhance the connection strength between the middle pier of the foundation, the cap and the bottom plate. Compared with traditional hollow wind turbine foundations, the cantilever structure of the middle pier is canceled, which can greatly reduce the foundation formwork removal time.

Figure 11:
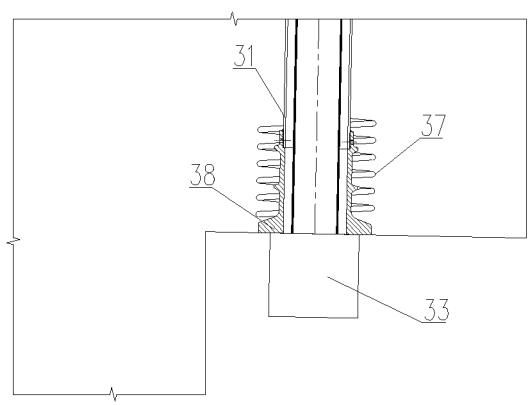
FIG. 11 is a partial detailed view of the anchor end under the gear-reinforced wind turbine foundation in the embodiment of the present invention, i.e. the enlarged view of part F in FIG. 9.

As shown in FIG. 11, the steel strand through pipe 31 and the lower anchor pad sleeve 38 are embedded in the hollow wind turbine foundation 4. The lower anchor pad sleeve 38 is connected with the lower end of the steel strand through pipe 31. The lower end of the lower anchor pad sleeve 38 is usually provided with a spiral hoop 37 to enhance the local bearing capacity of the concrete at the anchor end.

Figure 12:
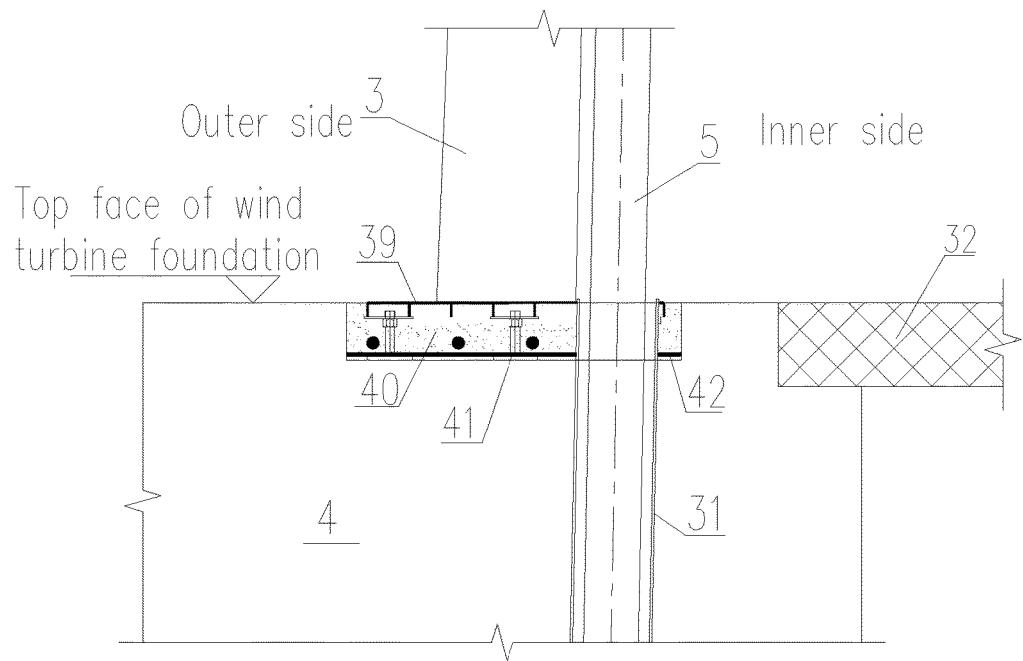
FIG. 12 is a partial detailed view of the connection between the gear-reinforced wind turbine foundation and the bottom segment of the tower tube in the embodiment of the present invention, i.e. the enlarged view of part G in FIG. 9.

As shown in FIG. 12, the contacting area of the top face of the wind turbine foundation 4 and the bottom segment of the concrete tower tube 3 is provided with a groove, and the reinforcement mesh 42 is placed at the bottom of the groove. The steel grid 39 is placed at the top, and the leveling bolt 41 is set at the lower part of the steel grid 39. After leveling, C80 high-strength grouting material 40 is poured into the groove and the surface is closed until the flatness is controlled at 2 mm. As a preferred solution, the width of the groove is set to be twice of the wall thickness of the bottom pipe segment, 600 mm, and the bottom pipe segment is placed in the middle of the groove to achieve a reasonable spread of concentrated stress in the contact area.

As one of the schemes, the gear-reinforced hollow wind turbine foundation 4 is constructed by cast-in-place concrete. After the foundation pit is excavated, the cushion is poured, the reinforcement bars are bound, the formwork is erected, and the embedded cable sleeve 30 and the embedded steel strand through pipe 31 are accurately installed, and then the concrete is poured and maintained at one time. After the concrete strength reaches the design requirements, the concrete tower tube 3 is hoisted and the steel strands 5 are threaded and stretched.

As shown in FIG. 13 to FIG. 16, the steel-concrete transition section 2 comprises an upper flange plate 43, an anchor flange plate 46, a lower flange plate 48, a flange tube section 44, a stiffening plate 47 and an upper anchor plate 49. Among them, the upper flange plate 43, the anchor flange plate 46 and the lower flange plate 48 are all circular ring-shaped steel plates, which are welded with the flange tube section 44, and the upper flange plate 43 is connected with the bottom flange of the steel tower tube 1 through the high-strength bolt assembly.

Figure 15:
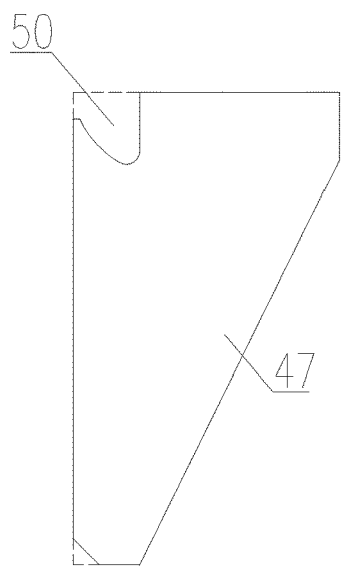
FIG. 15 is an elevation view of the stiffening plate of the steel-concrete transition section structure in the embodiment of the present invention.

As shown in FIG. 13 to FIG. 16, the anchor flange is equipped with sixteen steel strand perforations 53. Considering that the outer diameter of steel strand 5 is 148 mm, the diameter of steel strand perforations 53 on the anchor flange plate 45 are set as 175 mm, and the circumferential spacing between the prestressed steel strands 5 is 22.5°. The stiffening plates 47 are placed between the anchor flange plate 46 and the lower flange plate 48, and are evenly arranged on both sides of the steel strand perforation 53 in pairs. The upper part of the stiffening plate 47 is welded with the anchor flange plate 46, the outer side is welded with the inner wall of the flange tube section 44, and the lower part is welded with the lower flange plate 48. As shown in FIG. 15, an arc-shaped opening 50 is set at the connection between the upper end of the stiffening plate 47, the anchor flange plate 46 and the inner wall of the flange tube section 44, so as to smooth local stress transition and optimize stress transmission path; the stiffening plate 47 is a trapezoidal steel plate, the upper end is flush with the inner side of the anchor flange plate 46, and the lower end is flush with the inner side of the lower flange plate 48.

Figure 13:
FIG. 13 is an overall elevation view of the steel-concrete transition section structure in the embodiment of the present invention.
Figure 14:
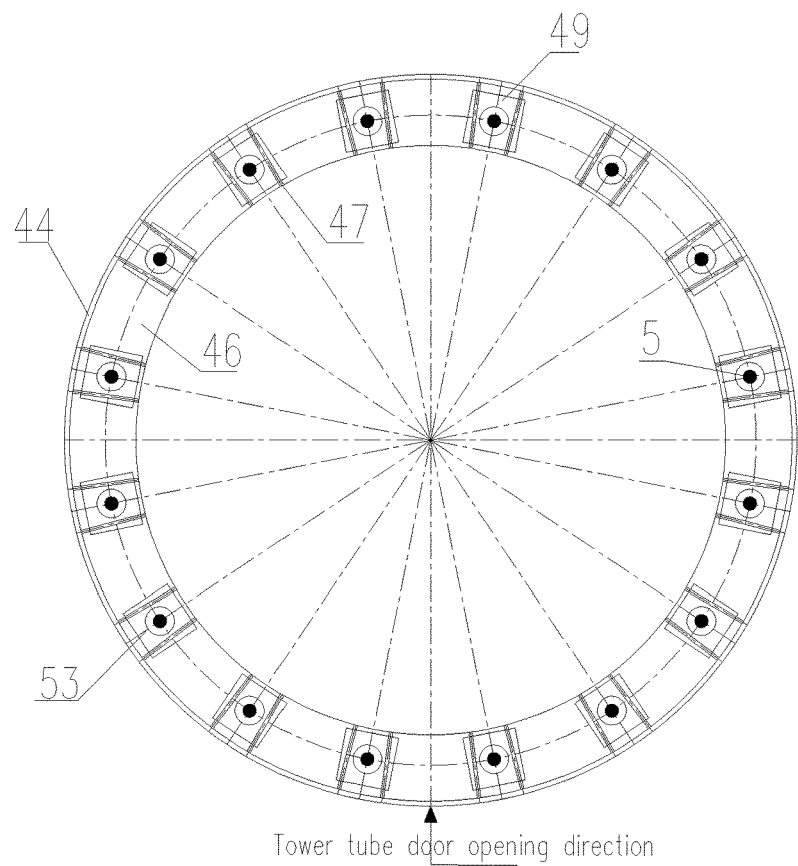
FIG. 14 is a C-C cross-sectional view of the anchor flange plate of the steel-concrete transition section structure in the embodiment of the present invention.

As shown in FIG. 13, the anchor flange plate 46 overhangs the inner facade of the concrete tower tube 3, and the upper anchor end of the steel strand 5 is offset to the center side of the tower tube to avoid interference between the prestressed steel strand 5 and the inner wall of the concrete tower tube 3. On the premise of non-interference, the steel strand 5 is arranged close to the inner wall of the concrete tower tube 3 as much as possible to increase the root opening of the steel strand 5 and improve the stability of tower. In this embodiment, the spacing between the steel strand 5 and the inner wall of the concrete tower tube 3 is 80 mm. The top face of the anchor flange 46 is placed with wedge-shaped anchor pad plates 49 corresponding to the number of the prestressed steel strands 5. The bottom face of wedge-shaped anchor pad plate 49 is a flat surface, and the top face is an inclined plane (the side close to the center line of the tower tube is thin, and the radial outer side is thick). The slope of the inclined plane is orthogonal to the steel strand 5. A 175 mm diameter steel strand perforation 53 is set in the middle of the wedge-shaped anchor pad plate 49. After the tension is completed, a coating of non-sticking anti-corrosion grease for prestressed reinforcement (meeting JG/T 430-2014 standard) is applied at the upper anchor head 45 of the steel strand 5 for anti-corrosion treatment, and a protective cover is installed above the wedge-shaped anchor pad plate 49 for sealing treatment; at the same time, the same anti-corrosion sealing treatment is carried out at thirty three lower anchor heads of steel strands in the foundation cavity.

Figure 16:
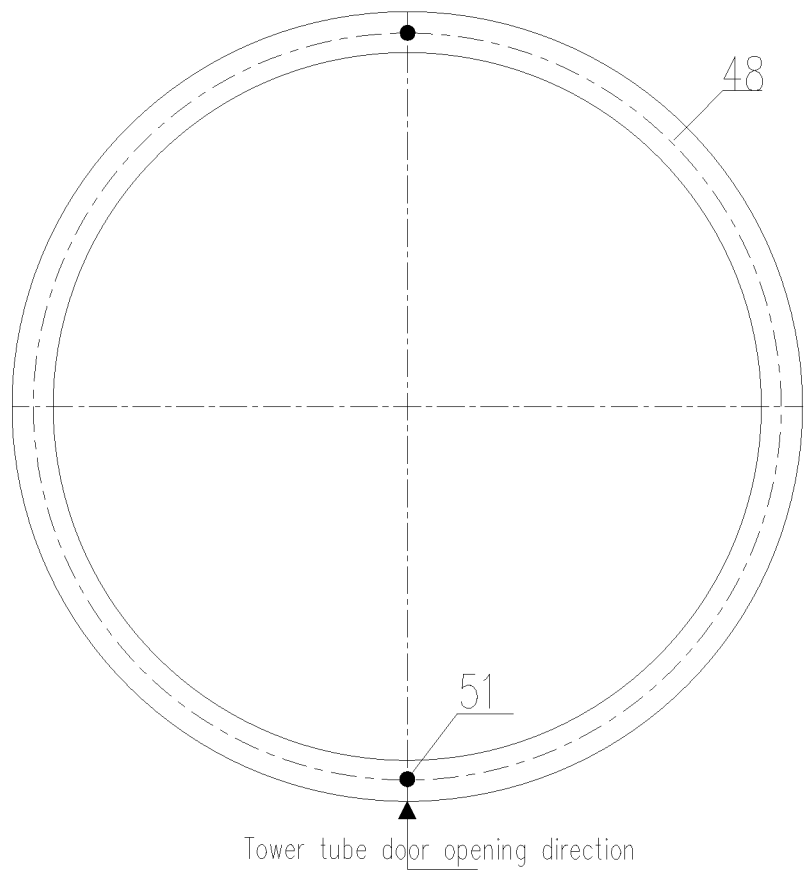
FIG. 16 is a schematic diagram of the lower flange plate of the steel-concrete transition section structure in the embodiment of the present invention.

As shown in FIG. 16, the lower flange plate 48 of the steel-concrete transition section 2 is provided with two transition section positioning pin perforations 51, which are positioned and assembled with the positioning pin on the top of the concrete tower tube of the top section, so as to determine the installation angle of the transition section 2. The flatness of the top face of the upper flange 43 after the transition section 2 is hoisted is controlled in 3 mm.

Considering that the steel-concrete transition section 2 is the transition structure between the steel tower tube 1 and the concrete tower tube 3 where the stiffness changes suddenly, as a preferred scheme, all welds of the transition section 2 shall be polished to eliminate residual stress, so as to enhance the fatigue resistance of the transition section 2.

Figure 17:
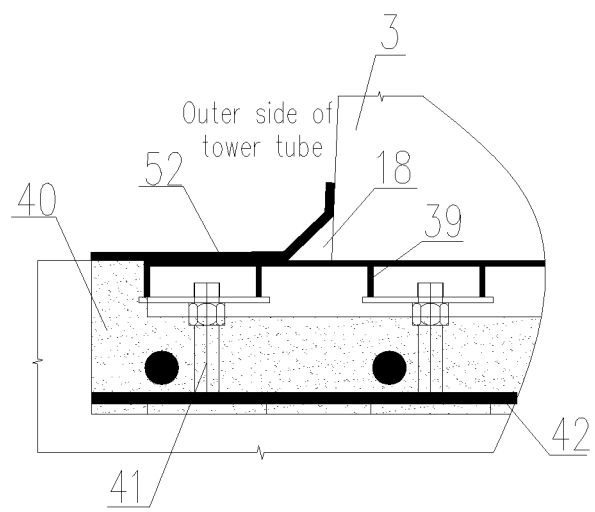
FIG. 17 is a schematic diagram of the waterproof treatment at the seam between the wind turbine foundation and the bottom segment of the concrete tower tube in the embodiment of the present invention.

As shown in FIG. 17, after the overall installation of the tower is completed, at the outer side of the seam between the wind turbine foundation 4 and the bottom concrete tower tube segment 3, first apply 20 mm high structural glue 18 with a triangular cross section, and then repeatedly apply a asphalt waterproof layer 52 after the surface of the structural adhesive is cleaned (to ensure that there is no visible water).

In FIG. 7, the No. 27 shows the location of positioning pins 9 and 10 of the concrete tower tube segment 8, and the spacing between the two positioning pins is 180°. the structural adhesive 18 can use Sikadur-31 SBA solvent-free two-component thixotropic epoxy structural adhesive or other products with the same properties.

The above embodiment is only a preferred technical solution of the present invention, and those skilled in the art should understand that the technical scheme or parameters in the embodiment can be modified or replaced without departing from the principle and essence of the present invention, which shall be covered by the protection scope of the present invention.

The invention claimed is:

1. A prestressed-bolted dry-assembled segmental precast hybrid tower without grouting comprises a top steel tower tube, a steel-concrete transition section, a concrete tower tube, a bottom hollow wind turbine foundation and prestressed steel strands, which the steel tower tube, the steel-concrete transition section, the concrete tower tube and the hollow wind turbine foundation are connected by the prestressed steel strand from top to bottom to improve an overall bending resistance of the hybrid tower, and a precast concrete tower tube segment is formed by splicing several circular arc-shaped precast concrete pipe segments in a circumferential direction; wherein:

an upper end of the prestressed steel strands is anchored to an anchor flange plate which is overhanging to a center of the steel-concrete transition section, and a lower end is anchored on a bottom face of a wind turbine foundation corbel, so that the prestressed steel strands do not pass through an inner part of the concrete tower tube;

the hybrid tower adopts external prestressed steel strands, which the circular arc-shaped precast concrete pipe segments are not provided with steel strand through pipes, are not provided with connecting reinforcement bars on vertical and horizontal end faces, but are solid pipe segments with smooth surfaces on all sides, so that a flatness of an upper end face of the pipe segments is not greater than 2 mm, and a flatness difference of the vertical end faces of the pipe segment are not greater than 2 mm, to achieve requirements of grouting-free dry splicing and effective control of thickness of a following structural adhesive;

the circular arc-shaped precast concrete pipe segments are not provided with reinforcement bar connection in the circumferential direction, but are formed by grouting free dry splicing, and are connected by horizontally circumferentially arranged prestressed bent bolts;

the structural adhesive is used for grouting free splicing between the concrete tower tube segments, a maximum thickness of the structural adhesive is not greater than 3 mm, a curing time of the structural adhesive is less than 1 hour, and a strength can reach C80 in 7 days; a same structural adhesive that are used between horizontal seams of the concrete tower tube segments can also be used between vertical seams of the concrete tower tube segments;

the structural adhesive is used for grouting free splicing between the vertical end faces of the segments, and the maximum thickness of the structural adhesive is not greater than 3 mm;

the concrete tower tube segments are positioned by positioning pins, and upper and lower segments are positioned and installed; thickness control gaskets are set between all vertical seams of an upper concrete tower tube segments and an upper end face of a lower concrete tower tube segments;

a ring of groove is set in a contact area between a top face of the wind turbine foundation and a bottom concrete tower tube, a reinforcement bar mesh is placed at a bottom of the groove, a steel grid is placed at a top, and a leveling bolt is set at a lower part of the steel grid; after leveling the steel grid, C80 grouting material is poured into the groove and closes a surface to within 2 mm of flatness to form a leveled reinforcement structure;

left and right sides and upper and lower end faces of the circular arc-shaped precast concrete pipe segments are provided with chamfers, which provides an attachment area for an amount of extruded adhesive from pipe segment sections during a splicing process, wherein the wind turbine foundation adopts a gear-reinforced hollow wind turbine foundation, a middle pier of the hollow wind turbine foundation is concave inward to form a containing cavity, and a bottom of the containing cavity protrudes outward to form a plurality of concave cavity structures arranged circumferentially, correspondingly, the middle pier between two adjacent concave cavity structures forms a gear-shaped reinforcing pier protruding inward; the middle pier at a top of each concave cavity structure is used as a corbel, and a top face of the concave cavity structure and the top face of the hollow wind turbine foundation are preset with steel strand through pipes for the steel strands to pass through;

wherein a size of the concave cavity structure is only suitable for a construction operation space of the steel strand prestressing: a reinforced pier is arranged between the two adjacent concave cavity structures, and the gear-shaped reinforcing pier is formed in the wind turbine foundation to enhance a connection strength between the middle pier of the foundation, a cap and a bottom plate.

2. The prestressed-bolted dry-assembled segmental precast hybrid tower with grouting-free according to claim 1, wherein the circular arc-shaped precast concrete segments are provided with holes for horizontal prestressed bent bolts, and nut installation grooves are provided at corresponding positions on an inner wall of the pipe segments; an end face of the nut installation groove is orthogonal to the prestressed bent bolt hole; a top of the pipe segments is equipped with hanging nail embedded parts and positioning pin embedded parts, and a bottom of which is provided with reserved holes for the positioning pins.

3. The prestressed-bolted dry-assembled segmental precast hybrid tower with grouting-free according to claim 1, wherein a pipe segment size segmentation needs to meet the requirements of road transportation, after loading, a height is usually controlled below 4.5 m.

4. The prestressed-bolted dry-assembled segmental precast hybrid tower with grouting-free according to claim 1, wherein a bottom of the concrete tower tubes at non-wading machine positions have a door opening, and the precast concrete tower tube segments at the door opening realize two-way compensation of strength and stiffness by setting reinforced beams and columns or reinforced embedded steel plates.

5. The prestressed-bolted dry-assembled segmental precast hybrid tower with grouting-free according to claim 1, wherein the wind turbine foundation cancels a long cantilever middle pier structure, which reduces a time of removing a formwork of the hollow foundation and a waiting time of following procedures.

6. The prestressed-bolted dry-assembled segmental precast hybrid tower with grouting-free according to claim 1, wherein the steel-concrete hybrid transition section includes an upper flange plate, the anchor flange plate, a lower flange plate, a flange tube section, a stiffening plate and upper anchor pad plates, in which the upper flange plate, the anchor flange plate and the lower flange plate are all circular ring-shaped steel plates, which are welded with the flange tube section; the upper flange plate is connected with a bottom flange of the steel tower tube through bolt assembly, and the anchor flange plate is provided with prestressed steel strand perforations corresponding to a number of the prestressed steel strands.

7. The prestressed-bolted dry-assembled segmental precast hybrid tower with grouting-free according to claim 6, wherein the stiffening plate is placed between the anchor flange plate and the lower flange plate, and is evenly circumferentially arranged on the steel strand perforations in pairs; an upper part of the stiffening plate is welded with the anchor flange plate, an outer side is welded with an inner wall of the flange tube section, and a lower part is welded with the lower flange plate;

the anchor flange plate overhangs an inner facade of the concrete tower tube, and upper anchor ends of the steel strands are offset to a center side of the tower tube; anchor pad plates corresponding to the number of the prestressed steel strands are placed on a top face of the anchor flange; a bottom face of the anchor pad plates is flat, and a top face is inclined; a slope of the inclined face is orthogonal to the steel strands.

\* \* \* \* \*